US009823844B2

(12) United States Patent
Khon

(10) Patent No.: US 9,823,844 B2
(45) Date of Patent: Nov. 21, 2017

(54) MEMORY MANAGEMENT METHOD, MEMORY CONTROL CIRCUIT UNIT, AND MEMORY STORAGE APPARATUS

(71) Applicant: PHISON ELECTRONICS CORP., Miaoli (TW)

(72) Inventor: Luong Khon, Ho Chi Minh (VN)

(73) Assignee: PHISON ELECTRONICS CORP., Miaoli (TW)

( * ) Notice: Subject to any disclaimer, the term of this patent is extended or adjusted under 35 U.S.C. 154(b) by 131 days.

(21) Appl. No.: 15/075,202

(22) Filed: Mar. 21, 2016

(65) Prior Publication Data

US 2017/0199669 A1 Jul. 13, 2017

(30) Foreign Application Priority Data

Jan. 8, 2016 (TW) .............................. 105100516 A

(51) Int. Cl.
*G06F 3/06* (2006.01)

(52) U.S. Cl.
CPC .......... *G06F 3/0604* (2013.01); *G06F 3/0638* (2013.01); *G06F 3/0679* (2013.01)

(58) Field of Classification Search
CPC ......... G06F 12/0246; G06F 2212/7201; G06F 2212/7205; G06F 3/0679; G06F 3/0659; G06F 3/0604; G06F 2003/0697; G06F 3/0619; G06F 3/064; G06F 3/065; G06F 11/073; G06F 12/0238; G06F 2212/1016
See application file for complete search history.

(56) References Cited

U.S. PATENT DOCUMENTS

| | | | | |
|---|---|---|---|---|
| 9,721,669 B2 * | 8/2017 | Chu | ....................... | G11C 16/22 |
| 2010/0325344 A1 * | 12/2010 | Tan | ..................... | G06F 12/0246 711/103 |
| 2013/0326121 A1 * | 12/2013 | Cheng | ................. | G06F 12/0246 711/103 |

* cited by examiner

*Primary Examiner* — Zhuo Li
(74) *Attorney, Agent, or Firm* — JCIPRNET

(57) ABSTRACT

A memory management method is provided. The method includes receiving a write command, a first data, and a first instruction information corresponding to the write command, wherein the first instruction information instructs writing the first data into at least one first logical sub-unit of a first logical unit; executing load-align operation to the first data according to the first instruction information; writing an aligned first data obtained through the load-align operation into a first physical programming unit if a predetermined event does not occur during the load-align operation; and stopping the load-align operation and storing the first data and the first instruction information into a first physical erasing unit if the predetermined event occurs during the load-align operation, wherein the first instruction information is stored as a first valid bits information corresponding to the first data in the first physical erasing unit.

18 Claims, 8 Drawing Sheets

MEMORY MANAGEMENT METHOD, MEMORY CONTROL CIRCUIT UNIT, AND MEMORY STORAGE APPARATUS

CROSS-REFERENCE TO RELATED APPLICATION

This application claims the priority benefit of Taiwan application serial no. 105100516, filed on Jan. 8, 2016. The entirety of the above-mentioned patent application is hereby incorporated by reference herein and made a part of this specification.

BACKGROUND OF THE DISCLOSURE

Field of the Disclosure

The disclosure relates to a memory management method, and more particularly, to a memory management method, a memory control circuit unit, and a memory storage apparatus.

Description of Related Art

The growth of digital cameras, mobile phones, and MP3 players has been rapid in recent years. Consequently, the consumers' demand for storage media has increased tremendously. Since a rewritable non-volatile memory has characteristics such as data non-volatility, power-saving, small size, lack of mechanical structure, and fast reading and writing speed, the rewritable non-volatile memory is most suitable for these electronic products. Therefore, the flash memory industry has become a relatively important part in the electronic industry in recent years. For instance, the embedded multi media card (eMMC) widely used in mobile electronic apparatuses is a storage apparatus for which flash memory is used as storage medium.

In general, a storage apparatus adopting a rewritable non-volatile memory (such as solid state drive) needs to back up (or write) user data not yet written into the storage apparatus to the storage apparatus in a very short amount of time when a predetermined event occurs. Therefore, how to save time spent in backing up (or writing) user data not yet written is an important object for those skilled in the art.

Nothing herein should be construed as an admission of knowledge in the prior art of any portion of the disclosure. Furthermore, citation or identification of any document in this application is not an admission that such document is available as prior art to the disclosure, or that any reference forms a part of the common general knowledge in the art.

SUMMARY OF THE DISCLOSURE

The disclosure provides a memory management method, a memory control circuit unit, and a memory storage apparatus capable of effectively reducing the time of data backup.

An exemplary embodiment of the disclosure provides a memory management method for a rewritable non-volatile memory module, wherein the rewritable non-volatile memory module includes a plurality of physical erasing units, wherein each of the physical erasing units of the physical erasing units has a plurality of physical programming units. The memory management method includes receiving a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit; executing load-align operation corresponding to the first data to the first data according to the first instruction information; writing an aligned first data into a first physical programming unit obtained through the load-align operation if a predetermined event does not occur during the load-align operation; and stopping the load-align operation and storing the first data and the first instruction information corresponding to the write command into a first physical erasing unit among the physical erasing units if the predetermined event occurs during the load-align operation, wherein the first instruction information is stored as a first valid bits information corresponding to the first data in the first physical erasing unit.

An exemplary embodiment of the disclosure provides a memory control circuit unit configured to control a memory storage apparatus. The memory control circuit unit includes a host interface, a memory interface, and a memory management circuit. The host interface is coupled to the host system. The memory interface is coupled to a rewritable non-volatile memory module, wherein the rewritable non-volatile memory module includes a plurality of physical erasing units, wherein each of the physical erasing units of the physical erasing units has a plurality of physical programming units. The memory management circuit includes a first processing unit, a second processing unit, a third processing unit, and a fourth processing unit. The first processing unit is coupled to the memory interface. The second processing unit is coupled to the first processing unit. The third processing unit is coupled to the host interface. The fourth processing unit is coupled to the first processing unit, the second processing unit, and the third processing unit. The third processing unit receives a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit. The fourth processing unit and the first process unit execute load-align operation corresponding to the first data to the first data according to the first instruction information. The first processing unit writes an aligned first data obtained through the load-align operation into the first physical programming unit if a predetermined event does not occur during the load-align operation. Moreover, the fourth processing unit and the first processing unit stop the load-align operation if the predetermined event occurs during the load-align operation, and the first processing unit stores the first data and the first instruction information corresponding to the write command in a first physical erasing unit among the physical erasing units, wherein the first instruction information is stored as a first valid bits information corresponding to the first data in the first physical erasing unit.

An exemplary embodiment of the disclosure provides a memory storage apparatus including a connection interface unit, a rewritable non-volatile memory module, and a memory control circuit unit. The connection interface unit is coupled to the host system. The rewritable non-volatile memory module includes a plurality of physical erasing units, wherein each of the physical erasing units of the physical erasing units has a plurality of physical programming units. The memory control circuit unit is coupled to the connection interface unit and the rewritable non-volatile memory module. The memory control circuit unit receives a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit. The memory control circuit unit executes load-align operation corresponding to the first data to the first data according to the first instruction information. The memory control circuit unit writes an aligned first data obtained through the load-align operation into a first physical programming unit if a predetermined event does not occur during the load-align operation. The memory control circuit unit stops the load-align operation if the predetermined event occurs during the load-align operation, and stores the first data and the first instruction information corresponding to the write command in a first physical erasing unit among the physical erasing units, wherein the first instruction information is stored as a first valid bits information corresponding to the first data in the first physical erasing unit.

Based on the above, when a predetermined event occurs, the memory management method, the memory control circuit unit, and the memory storage apparatus provided by the present exemplary embodiments can rapidly store the instruction information originally configured to perform load-align operation on the write data and the write data in a predetermined physical erasing unit under the conditions of not having to compute the progress of the load-align operation and using the original instruction information, thus saving time for processing the predetermined event.

It should be understood, however, that this Summary may not contain all of the aspects and embodiments of the disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
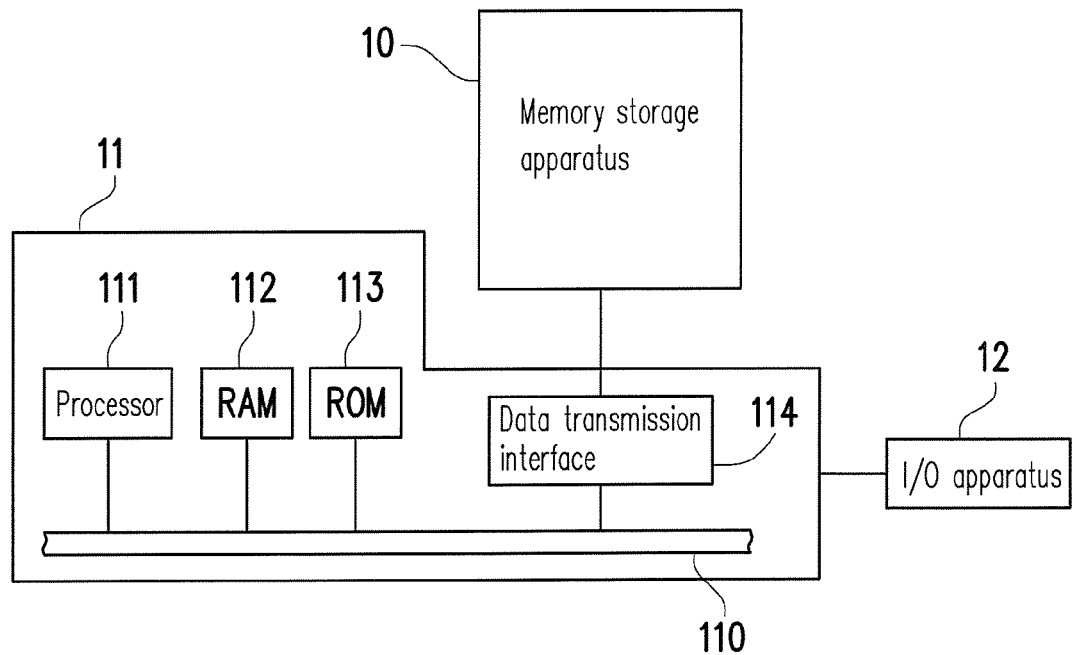
FIG. 1 is a schematic of a host system, a memory storage apparatus, and an input/output (I/O) apparatus illustrated according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2:
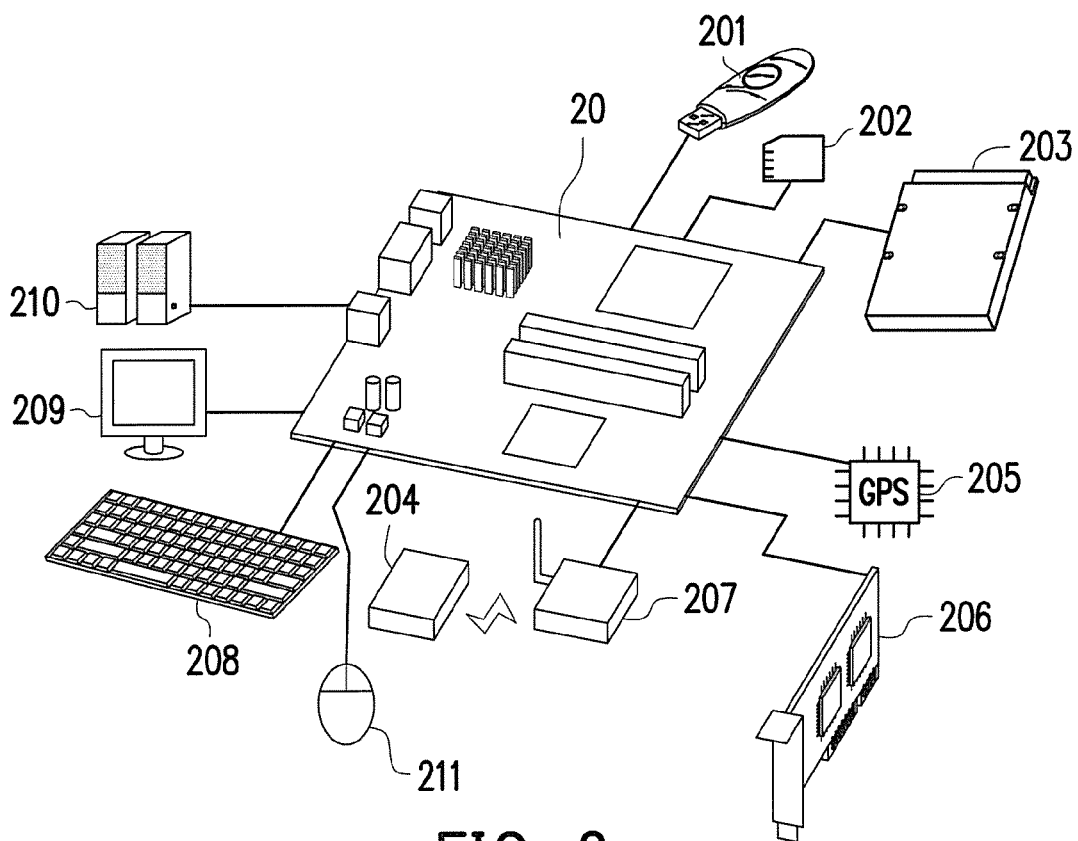
FIG. 2 is a schematic of a host system, a memory storage apparatus, and an I/O apparatus illustrated according to another exemplary embodiment of the disclosure.

FIG. 1 is a schematic of a host system, a memory storage apparatus, and an input/output (I/O) apparatus illustrated according to an exemplary embodiment of the disclosure. FIG. 2 is a schematic of a host system, a memory storage apparatus, and an I/O apparatus illustrated according to another exemplary embodiment of the disclosure.

Referring to FIG. 1 and FIG. 2, a host system 11 generally includes a processor 111, a random access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to a memory storage apparatus 10 through the data transmission interface 114. For instance, the host system 11 can write data into the memory storage apparatus 10 through the data transmission interface 114 or read data from the memory storage apparatus 10. Moreover, the host system 11 is coupled to the I/O apparatus 12 through the system bus 110. For instance, the host system 11 can send an output signal to the I/O apparatus 12 or receive an input signal from the I/O apparatus 12 through the system bus 110.

In the present exemplary embodiment, the processor 111, the RAM 112, the ROM 113, and the data transmission interface 114 can be disposed on a motherboard 20 of the host system 11. The quantity of the data transmission interface 114 can be one or a plurality. The motherboard 20 can be coupled to the memory storage apparatus 10 in a wired or wireless method through the data transmission interface 114. The memory storage apparatus 10 can be, for instance, a flash drive 201, a memory card 202, a solid state drive (SSD) 203, or a wireless memory storage apparatus 204. The wireless memory storage apparatus 204 can be, for instance, a memory storage apparatus based on various wireless communication techniques such as a near-field communication (NFC) memory storage apparatus, a wireless fax (WiFi) memory storage apparatus, a bluetooth memory storage apparatus, or a low-power bluetooth memory storage apparatus (such as iBeacon). Moreover, the motherboard 20 can also be coupled to various I/O apparatuses such as a global positioning system (GPS) module 205, a network interface card 206, a wireless transmission apparatus 207, a keyboard 208, a screen 209, a speaker 210, or a mouse 211 through the system bus 110. For instance, in an exemplary embodiment, the motherboard 20 can access the wireless memory storage apparatus 204 through the wireless transmission apparatus 207.

Figure 3:
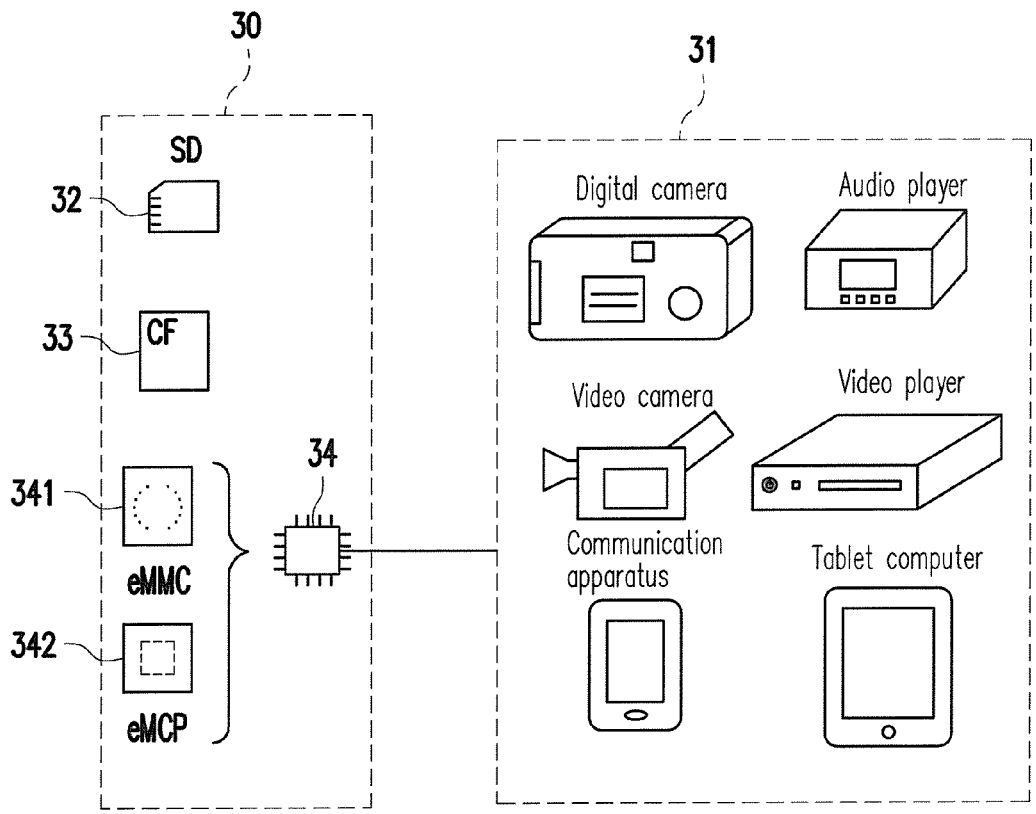
FIG. 3 is a schematic of a host system and a memory storage apparatus illustrated according to another exemplary embodiment of the disclosure.

In an exemplary embodiment, the mentioned host system is any system that can substantially store data with the memory storage apparatus. Although in the above exemplary embodiment, the host system is exemplified by a computer system, FIG. 3 is a schematic of a host system and a memory storage apparatus illustrated according to another exemplary embodiment of the disclosure. Referring to FIG. 3, in another exemplary embodiment, the host system 31 can also be a system such as a digital camera, a video camera, a communication apparatus, an audio player, a video player, or a tablet computer, and the memory storage apparatus 30 can be various non-volatile memory storage apparatuses used thereby such as an SD card 32, a CF card 33, or an embedded storage apparatus 34. The embedded storage apparatus 34 includes various types of embedded storage apparatuses for which a memory module is directly coupled on the substrate of the host system, such as an embedded MMC (eMMC) 341 and/or an embedded multi-chip package (eMCP) 342.

Figure 4:
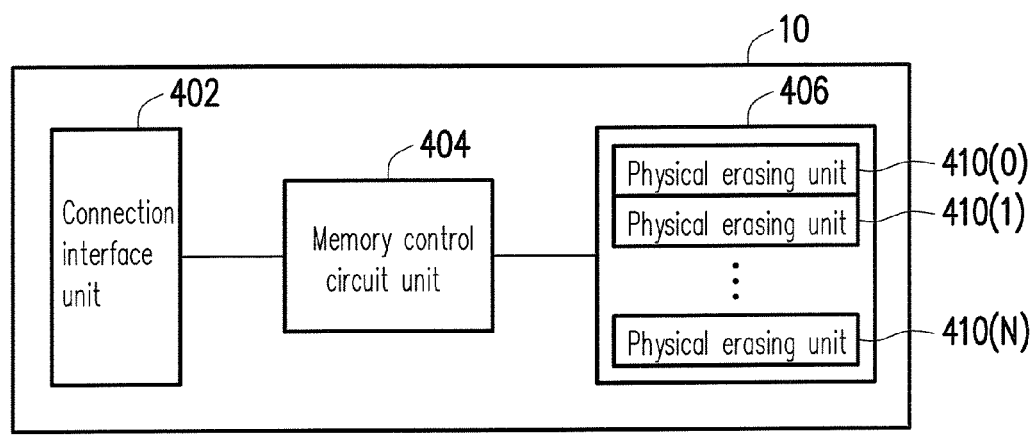
FIG. 4 is a schematic block diagram of a memory storage apparatus illustrated according to an exemplary embodiment of the disclosure.

FIG. 4 is a schematic block diagram of a memory storage apparatus illustrated according to an exemplary embodiment of the disclosure.

Referring to FIG. 4, the memory storage apparatus 10 includes a connection interface unit 402, a memory control circuit unit 404, and a rewritable non-volatile memory module 406.

In the present exemplary embodiment, the connection interface unit 402 is compatible with the serial advanced technology attachment (SATA) standard. However, it should be understood that, the disclosure is not limited thereto, and the connection interface unit 402 can also satisfy the parallel advanced technology attachment (PATA) standard, Institute of Electrical and Electronic Engineers (IEEE) 1394 standard, peripheral component interconnect express (PCI express) interface standard, universal serial bus (USB) standard, secure digital (SD) interface standard, ultra high speed-I (UHS-I) interface standard, ultra high speed-II (UHS-II) interface standard, memory sick (MS) interface standard, multi-chip package interface standard, multi media card (MMC) interface standard, embedded multimedia card (eMMC) interface standard, universal flash storage (UFS) interface standard, embedded multi-chip package (eMCP) interface standard, compact flash (CF) interface standard, integrated device electronics (IDE) interface standard, or other suitable standards. The connection interface unit 402 can be sealed in a chip with the memory control circuit unit 404. Alternatively, the connection interface unit 402 is disposed outside of a chip containing the memory control circuit unit 404.

The memory control circuit unit 404 is configured to execute a plurality of logic gates or control commands implemented in a hardware form or in a firmware form. The memory control circuit unit 404 also performs data operations such as writing, reading, and erasing in the rewritable non-volatile memory storage module 406 according to the commands of the host system 11.

The rewritable non-volatile memory module 406 is coupled to the memory control circuit unit 404 and is configured to store data written by the host system 11. The rewritable non-volatile memory module 406 has physical erasing units 410(0)-410(N). For instance, the physical erasing units 410(0)-410(N) can belong to the same memory die or different memory dies. Each of the physical erasing units respectively has a plurality of physical programming units, wherein physical programming units belonging to the same physical erasing unit can be independently written and erased at the same time. However, it should be understood that, the disclosure is not limited thereto. Each of the physical erasing units can be formed by 64 physical programming units, 256 physical programming units, or any other number of physical programming units.

More specifically, the physical erasing unit is the smallest unit of erasing. That is, each of the physical erasing units contains the smallest number of memory cells erased together. The physical programming unit is the smallest unit of programming. That is, the physical programming unit is the smallest unit of data writing. Each of the physical programming units generally includes a data bit area and a spare bit area. The data bit area contains a plurality of physical access addresses configured to store user data, and the spare bit area is configured to store system data (for instance, control information and error-correcting code). In the present exemplary embodiment, the data bit area of each of the physical programming units contains 8 physical access addresses (also referred to as physical sectors hereinafter), and the size of one physical sector is 512 bytes. However, in other exemplary embodiments, the data bit area can also contain a greater or lesser number of physical sectors, and the disclosure does not limit the size and the number of the physical access address. In an exemplary embodiment, the physical erasing unit is a physical block, and the physical programming unit is a physical page, but the disclosure is not limited thereto.

The memory control circuit unit 404 logically groups the physical erasing units 410(0)-410(N) into a data area, an spare area, a system area, and a replacement area.

The physical erasing units logically belonging to the data area and the spare area are configured to store data from the host system 11. Specifically, the physical erasing units of the data area are regarded as physical erasing units in which data is stored, and the physical erasing units of the spare area are configured to replace the physical erasing units of the data area. In other words, when the host system 11 receives a write command and data to be written, the memory control circuit unit 404 selects the physical erasing units from the spare area, and writes data into the selected physical erasing units to replace the physical erasing units of the data area. The physical erasing units logically belonging to the system area are configured to record system data. For instance, the system data includes the manufacturer and the model of the rewritable non-volatile memory module, the quantity of physical erasing units of the rewritable non-volatile memory module, and the quantity of physical programming units of each of the physical erasing units. The physical erasing units logically belonging to the replacement area are configured for the replacement procedure of damaged physical erasing units to replace damaged physical erasing units. Specifically, if the replacement area still has normal physical erasing units and the physical erasing units of the data area are damaged, then the memory control circuit unit 404 selects normal physical erasing units from the replacement area to replace the damaged physical erasing units.

In particular, the quantity of the physical erasing units of the data area, the spare area, the system area, and the replacement area is different according to different memory specifications. Moreover, it should be understood that, in the operation of the memory storage apparatus 10, the grouping relationship of the physical erasing units to the data area, the spare area, the system area, and the replacement area is dynamically changed. For instance, when the physical erasing units in the spare area are damaged and replaced by the physical erasing units of the replacement area, the original physical erasing units of the replacement area are associated to the spare area.

In an embodiment, the memory control circuit unit 404 configures logical units to map the physical erasing units of the data area, wherein each of the logical units has a plurality of logical sub-units. The logical units can be logical blocks or logical pages, and corresponding logical sub-units can be logical pages or logical sectors. The logical blocks are configured to map the physical erasing units of the data area. The logical pages are configured to map the physical programming units in corresponding physical erasing units. The logical sectors are configured to map the physical sectors of corresponding physical programming units. Moreover, when the host system 11 is to write data into the logical blocks or update data stored in the logical blocks, the memory control circuit unit 404 selects one physical erasing unit from the spare area to write data so as to rotate the physical erasing units of the data area.

In the present exemplary embodiment, the size of the logical pages is 4 kilobytes (k bytes), the same as the size of the physical programming units. Moreover, each of the logical pages has 8 logical sectors, but the disclosure is not limited thereto, and the quantity of logical sectors of each of the logical pages is changed in correspondence to the quantity of physical sectors of the physical programming unit mapped by each of the logical pages (for instance, the quantity of logical sectors of each of the logical pages can be greater than or less than the quantity of "8").

To identify that the data of each of the logical units (such as logical blocks) is stored in the specific physical erasing unit, in the present exemplary embodiment, the memory control circuit unit 404 records the mapping between the logical units and the physical erasing units. Moreover, when the host system 11 is to access data in the logical sub-unit, the memory control circuit unit 404 confirms the logical unit that the logical sub-unit belongs to, and issues a corresponding command sequence to the rewritable non-volatile memory module 406 to access data in the physical erasing unit mapped by the logical unit. For instance, in the present exemplary embodiment, the memory control circuit unit 404 stores a logic-to-physical address mapping table in the rewritable non-volatile memory module 406 to record the physical erasing units mapped by each of the logical units, and when data is to be accessed, the memory control circuit unit 404 loads the logic-to-physical address mapping table to a buffer memory for protection. When the memory control circuit unit 404 is to update the mapping of a certain logical unit, the logic-to-physical address mapping table corresponding to the logical area to which the logical unit belongs is loaded to the buffering memory for update. Similarly, the memory control circuit unit 404 stores the logic-to-physical address mapping table in the rewritable non-volatile memory module 406 to record the physical programming units mapped by each of the logical sub-units (such as logical pages).

In the present exemplary embodiment, the rewritable non-volatile memory module 406 is a multi-level cell (MLC) NAND flash memory module (i.e., a flash memory module for which one memory cell can store 2 data bits). However, the disclosure is not limited thereto, and the rewritable non-volatile memory module 406 can also be a single-level cell (SLC) NAND flash memory module (i.e., a flash memory module for which one memory cell can store 1 data bit), a trinary-level cell (TLC) NAND flash memory module (i.e., a flash memory module for which one memory cell can store 3 data bits), other flash memory modules, or other memory modules having the same characteristics.

Figure 5:
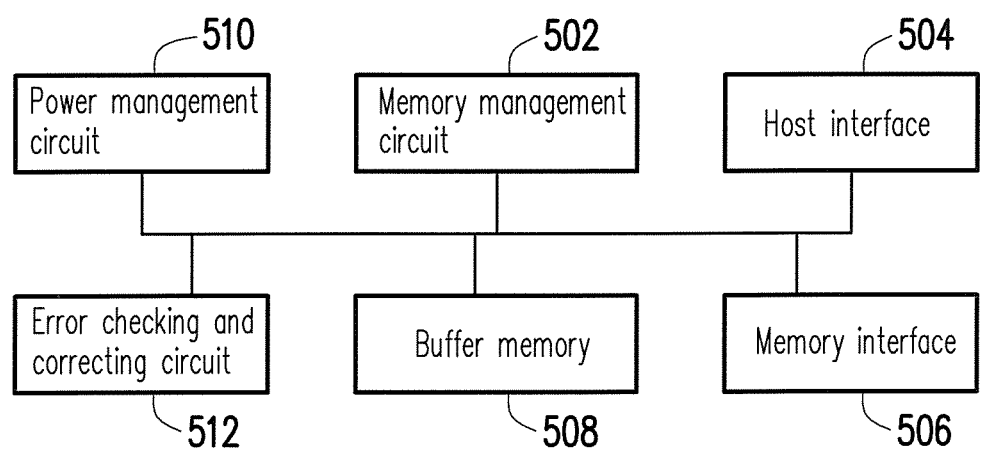
FIG. 5 is a schematic block diagram of a memory control circuit unit illustrated according to an exemplary embodiment.

FIG. 5 is a schematic block diagram of a memory control circuit unit illustrated according to an exemplary embodiment.

Referring to FIG. 5, the memory control circuit unit 404 includes a memory management circuit 502, a host interface 504, and a memory interface 506.

The host interface 504 is coupled to the memory management circuit 502 and is configured to be coupled to the connection interface unit 402 so as to receive and identify commands and data sent by the host system 11. In other words, the commands and the data sent by the host system 11 are sent to the memory management circuit 502 through the host interface 504. In the present exemplary embodiment, the host interface 504 is compatible with the eMMC standard. However, it should be understood that the disclosure is not limited thereto, and the host interface 504 can also be compatible with the PATA standard, IEEE 1394 standard, PCI Express standard, UFS standard, UHS-I standard, UHS-II standard, SD standard, MS standard, SATA standard, CF standard, IDE standard, or other suitable data transmission standards.

The memory interface 506 is coupled to the memory management circuit 502 and is configured to access the rewritable non-volatile memory module 406. In other words, data to be written into the rewritable non-volatile memory module 406 is converted to a format acceptable to the rewritable non-volatile memory module 406 through the memory interface 506.

In an exemplary embodiment, the memory control circuit unit 404 further includes a buffer memory 508, a power management circuit 510, and an error checking and correcting circuit 512.

The buffer memory 508 is coupled to the memory management circuit 502 and is configured to temporarily store data and commands from the host system 11 or data from the rewritable non-volatile memory module 406.

The power management circuit 510 is coupled to the memory management circuit 502 and is configured to control the power of the memory storage apparatus 10.

The error checking and correcting circuit 512 is coupled to the memory management circuit 502 and is configured to execute an error checking and correcting procedure to ensure the correctness of data. Specifically, when the memory management circuit 502 receives a writing command from the host system 11, the error checking and correcting circuit 512 generates an error checking and correcting code (ECC code) for the data corresponding to the writing command, and the memory management circuit 502 writes the data and ECC code corresponding to the writing command into the rewritable non-volatile memory module 406. Next, when reading data from the rewritable non-volatile memory module 406, the memory management circuit 502 also reads the ECC code corresponding to the data, and the error checking and correcting circuit 512 performs an error checking and correcting process to the read data based on the ECC code.

The memory management circuit 502 is configured to control the overall operation of the memory control circuit unit 404. Specifically, the memory management circuit 502 has a plurality of control commands. During the operation of the memory storage apparatus 10, the control commands are executed to perform various data operations such as writing, reading, and erasing.

In the present exemplary embodiment, the control commands of the memory management circuit 502 are implemented in a firmware form. For instance, the memory management circuit 502 has a microprocessor unit (not illustrated) and a read-only memory (not illustrated), and the control commands are burned into the read-only memory. During the operation of the memory storage apparatus 10, the control commands are executed by the microprocessor unit to perform data operations such as writing, reading, and erasing.

In another exemplary embodiment of the disclosure, the control commands of the memory management circuit 502 may also be stored in the form of program codes into a specific area (for instance, the system area in a memory module exclusively configured to store system data) of the rewritable non-volatile memory module 406.

Figure 6:
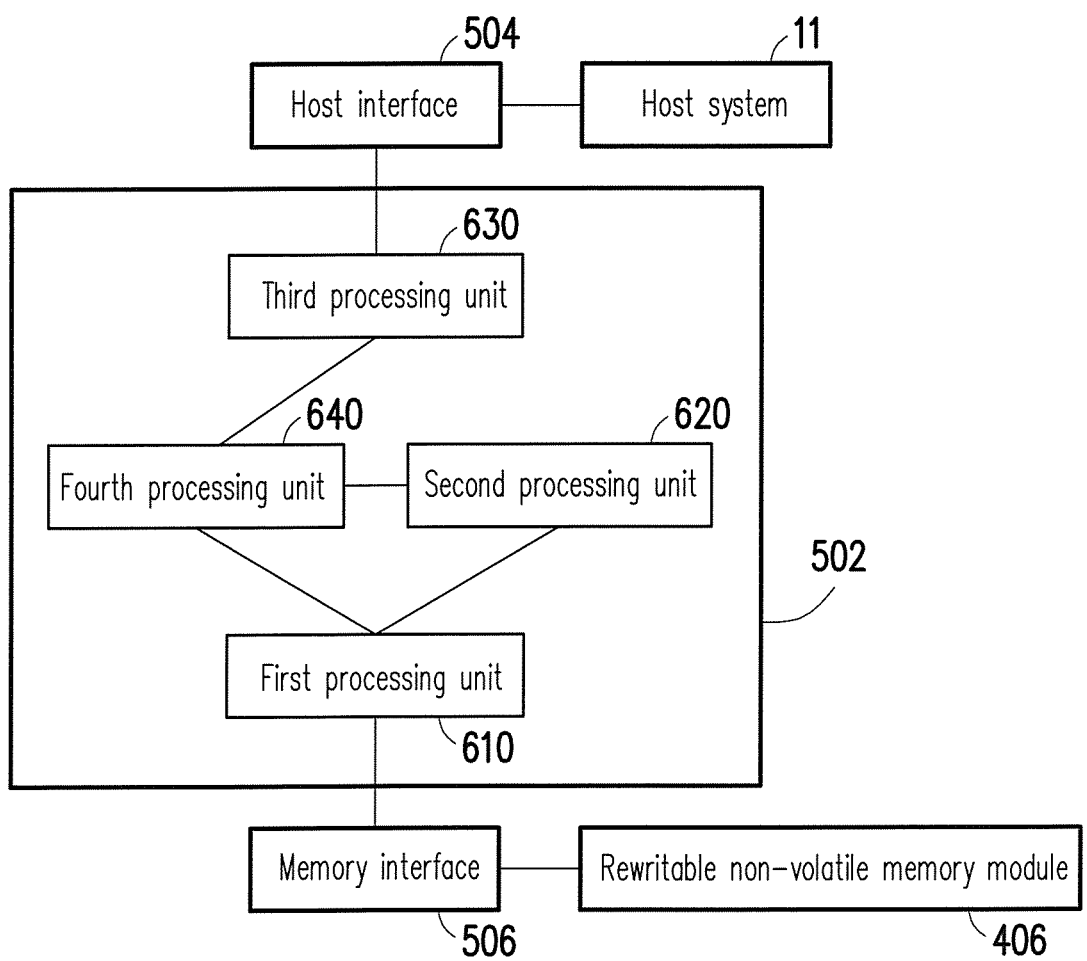
FIG. 6 is a schematic block diagram of a memory management circuit illustrated according to an exemplary embodiment.

FIG. 6 is a schematic block diagram of a memory management circuit illustrated according to an exemplary embodiment.

Referring to FIG. 6, in the present exemplary embodiment, the memory management circuit 502 includes a first processing unit 610, a second processing unit 620, a third processing unit 630, and a fourth processing unit 640. The first processing unit 610 is coupled to the memory interface 506. The second processing unit 620 is coupled to the first processing unit 610. The third processing unit 630 is coupled to the host interface. The fourth processing unit 640 is coupled to the first processing unit 610, the second processing unit 620, and the third processing unit 630.

The first processing unit 610, the second processing unit 620, the third processing unit 630, and the fourth processing unit 640 are hardware having computing power (such as chip sets or processors) capable of managing the overall operation of the memory management circuit 502, the memory control circuit unit 404, or the memory storage apparatus 10. In the present exemplary embodiment, each of the processing units can be, for instance, a central processing unit (CPU), a micro-processor, or other programmable microprocessors, a digital signal processor (DSP), a programmable controller, an application-specific integrated circuit (ASIC), a programmable logic device (PLD), or other similar apparatuses. Moreover, the memory management circuit 502 also has a microprocessor unit (not shown), a read-only memory (not shown), and a random-access memory (not shown). In particular, the read-only memory has a driving code, and when the memory control circuit unit 404 is enabled, the first processing unit 610, the second processing unit 620, the third processing unit 630, and the fourth processing unit 640 execute the driving code together to load the control commands stored in the rewritable non-volatile memory module 406 into the random-access memory of the memory management circuit 502. Then, the first processing unit 610, the second processing unit 620, the third processing unit 630, and the fourth processing unit 640 operate the control commands to perform data operations such as writing, reading, and erasing, or perform management of the memory storage apparatus 10.

Figure 7:
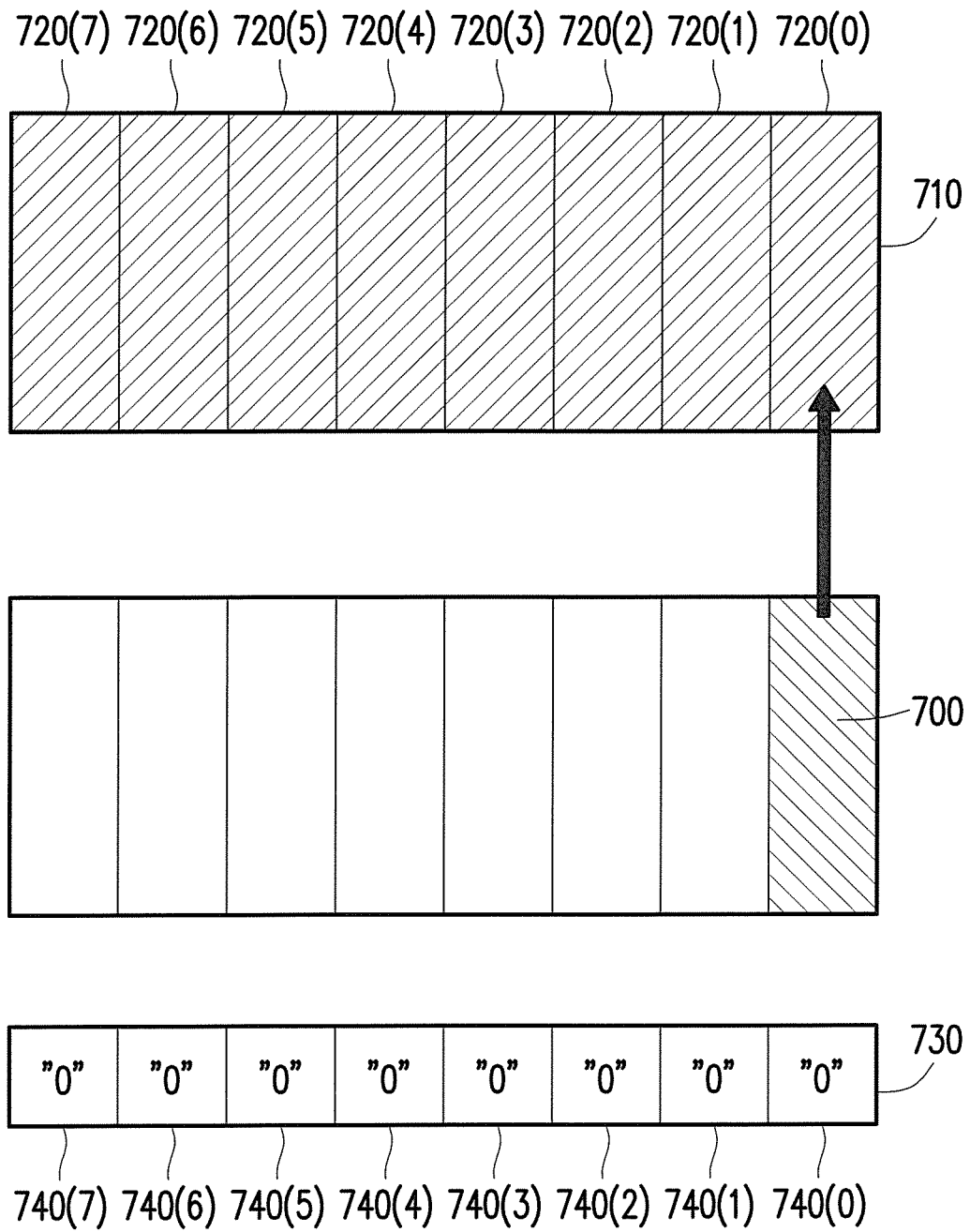
FIG. 7 is a schematic of a data and an instruction information corresponding to a write command illustrated according to an exemplary embodiment.

FIG. 7 is a schematic of a data and an instruction information corresponding to a write command illustrated according to an exemplary embodiment.

Referring to FIG. 7, the third processing unit 630 receives a write command and a write data 700 (also referred to as first data) and an instruction information 730 (also referred to as first instruction information) corresponding to the write command from the host system 11 through the host interface 504, wherein the write command is configured to instruct writing the first data 700 into a logical sector 720(0) (also referred to as first logical sub-unit) of a first logical page (also referred to as first logical unit) 710. As shown in FIG. 7, the first logical unit 710 has eight logical sub-units 720(0)-720(7), and data is stored in all of the 8 logical sub-units 720(0)-720(7) of the first logical unit 710 (as represented by left diagonal lines). Moreover, corresponding to the eight logical sub-units 720(0)-720(7), the first instruction info illation 730 also has bit values 740(0)-740(7) (also referred to as first bit values) respectively corresponding to each of the first logical sub-units 720(0)-720(7).

In the present exemplary embodiment, it assumed that the value of each of the first bit values 740(0)-740(7) of the first instruction information is marked as a first value (such as a value of "1") or a second value (such as a value of "0") according to whether the corresponding logical sub-units 720(0)-720(7) thereof are configured to store the first data. For instance, in the above example, the write command is configured to instruct writing the first data 700 (as shown in the right diagonal lines of FIG. 7) into the logical sub-unit 720(0) of the first logical unit 710. The first bit values respectively corresponding to the first instruction information 730 of the logical sub-units 720(0)-720(7) are respectively marked as "1", "0", "0", "0", "0", "0", "0", "0". In other words, the first bit value 740(0) corresponding to the logical sub-unit 720(0) storing the first data 700 is marked as "1" (for instance, the first bit value corresponding to the first logical sub-unit is marked as "1"), and the other first bit values are marked as "0" (for instance, the first bit values not corresponding to the first logical sub-unit are marked as "0"). In other words, the value of the first bit value of the first instruction information 730 would be changed with the position of the logical sub-unit stored by the first data 700. For instance, in another embodiment, if the first data of the write command is written into the logical sub-unit 720(7) of the first logical unit 710, the first instruction information corresponding to the write command would be marked as "0", "0", "0", "0", "0", "0", "0", "1".

It should be mentioned that, in the present exemplary embodiment, the first bit value corresponding to the first logical sub-unit storing the first data is marked as "1", and the other first bit values corresponding to logical sub-units not storing the first data are marked as "0", but the disclosure is not limited thereto. For instance, in other embodiments, the first bit value corresponding to the first logical sub-unit storing the first data is marked as "0", and the other first bit values corresponding to logical sub-units not storing the first data are marked as "1".

In the present exemplary embodiment, after the third processing unit 630 receives the write command and the first data 700 and the first instruction information 730 corresponding to the write command, the third processing unit 630 issues (or sends) the write command and the first data 700 and the first instruction information 730 corresponding to the write command to the fourth processing unit 640. In an embodiment, after the third processing unit 630 receives the write command and the first data 700 and the first instruction information 730 corresponding to the write command, the third processing unit 630 responds to the host system that the write command is processed.

After the fourth processing unit 640 receives the write command and the first data 700 and the first instruction information 730 corresponding to the write command, the first data 700 and the first instruction information 730 are first stored in a write buffer, and the write buffer is, for instance, an area divided from the random access memory of the memory management circuit for accessing write data and instruction information.

Then, the fourth 640 instructs the first processing unit 610 to cooperatively perform load-align operation on the first logical unit 710. In the following, the details of the load-align operation provided by the present exemplary embodiment are described with reference to FIG. 6, FIG. 7, and FIG. 8.

Figure 8:
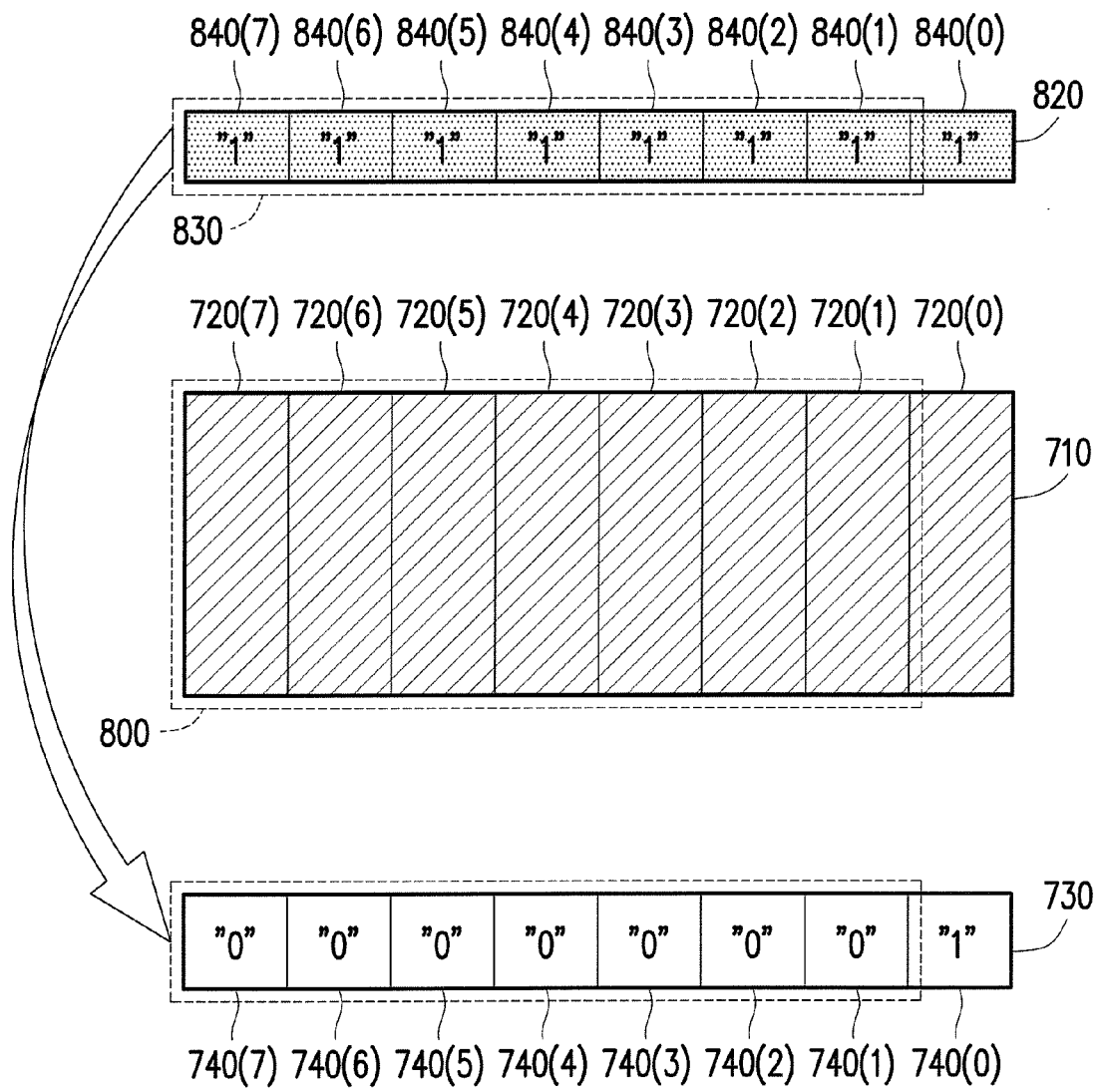
FIG. 8 is a schematic of reading data according to an instruction information illustrated according to an exemplary embodiment.

FIG. 8 is a schematic of reading data according to an instruction information illustrated according to an exemplary embodiment.

Referring to FIG. 8, as described above, it assumed that data was stored in the first logical sub-units 720(0)-720(7) in the first logical unit 710 (as shown in the left diagonal lines of FIG. 8). After the first processing unit 610 receives the instruction to perform load-align operation on the first logical unit 710 from the fourth processing unit 640, the first processing unit 610 first identifies whether data is stored in the current first logical unit 710. If the first processing unit 610 determines data is stored in the current first logical unit 710, then the first processing unit 610 merges the old stored data with the new first data 700 to be written into the first logical unit 710.

More specifically, the first processing unit 610 reads the old stored data stored in the first logical unit 710 according to the first instruction information 730. For instance, continuing with the above example, the first processing unit 610 identifies that the first data 700 currently to be written is stored in the logical sub-unit 720(0) of the first logical unit 710 through the first bit value 740(0) of the first value (such as "1") according to the first bit values 740(0)-740(7) of the first instruction information 730 of "1", "0", "0", "0", "0", "0", "0", "0", and the first processing unit 610 also identifies the first data 700 is not stored in the logical sub-units 720(1)-720(7) through the first bit values 740(1)-740(7) of the second value (such as "0"). Then, the first processing unit 610 reads the old data (also referred to as second data) from the logical sub-units 720(1)-720(7) of the first logical sub-unit 710 according to the logical sub-units 720(1)-720(7) corresponding to the first bit values 740(1)-740(7) marked as "0". For instance, a second data 800 is read from physical sectors corresponding to the logical sub-units 720(1)-720(7) among a plurality of physical sectors of the second physical programming unit according to the physical programming unit (also referred to as second physical programming unit) originally mapped to the first logical sub-unit 710.

Moreover, in the present exemplary embodiment, the first processing unit 610 also reads the valid bits information (also referred to as second valid bits information) corresponding to the second data 800 from the spare area (also referred to as second spare area) of the second physical programming unit. Specifically, the second spare area corresponding to the second physical programming unit stores a second valid bits information 820. The second valid bits information 820 has a plurality of valid bits values 840(0)-840(7) respectively corresponding to data stored in the plurality of physical sectors of the second physical programming unit, wherein each of the valid bits values 840(0)-840(7) is marked as "0" or "1" to indicate whether the data corresponding to each of the valid bits values 840(0)-840(7) is valid. For instance, if the data of a physical sector is valid, then the bit value corresponding to the valid bits information of the physical sector is marked as "1". On the contrary, if the data of a physical sector is not valid (or cannot be corrected), then the bit value corresponding to the valid bits information of the physical sector is marked as "0".

Continuing with the above example, in the present exemplary embodiment, if the current data stored by the current second physical programming units are all valid data, the valid bits values 840(0)-840(7) of the second valid bits information 820 would be marked as "1", "1", "1", "1", "1", "1", "1", "1". The first processing unit 610 reads the valid bits values 840(1)-840(7) (for instance, the second valid bits information 830 of the corresponding second data 800 of "1", "1", "1", "1", "1", "1", "1") corresponding to the second data 800 in the second valid bits information 820 according to the logical sub-units 720(1)-720(7) storing the second data in the second spare area currently mapped to the second physical programming unit of the first logical sub-unit 710.

Then, the first processing unit 610 sends the second data 800 and the second valid bits information 830 (such as the valid bits values 840(1)-840(7)) corresponding to the second data 800 to the fourth processing unit 640. The fourth processing unit 640 merges the second data 800 and the first data 700, and merges the second valid bits information 830 and the first instruction information 730 corresponding to the second data 800 to obtain an aligned data and a valid bits information corresponding to the aligned data.

Figure 9:
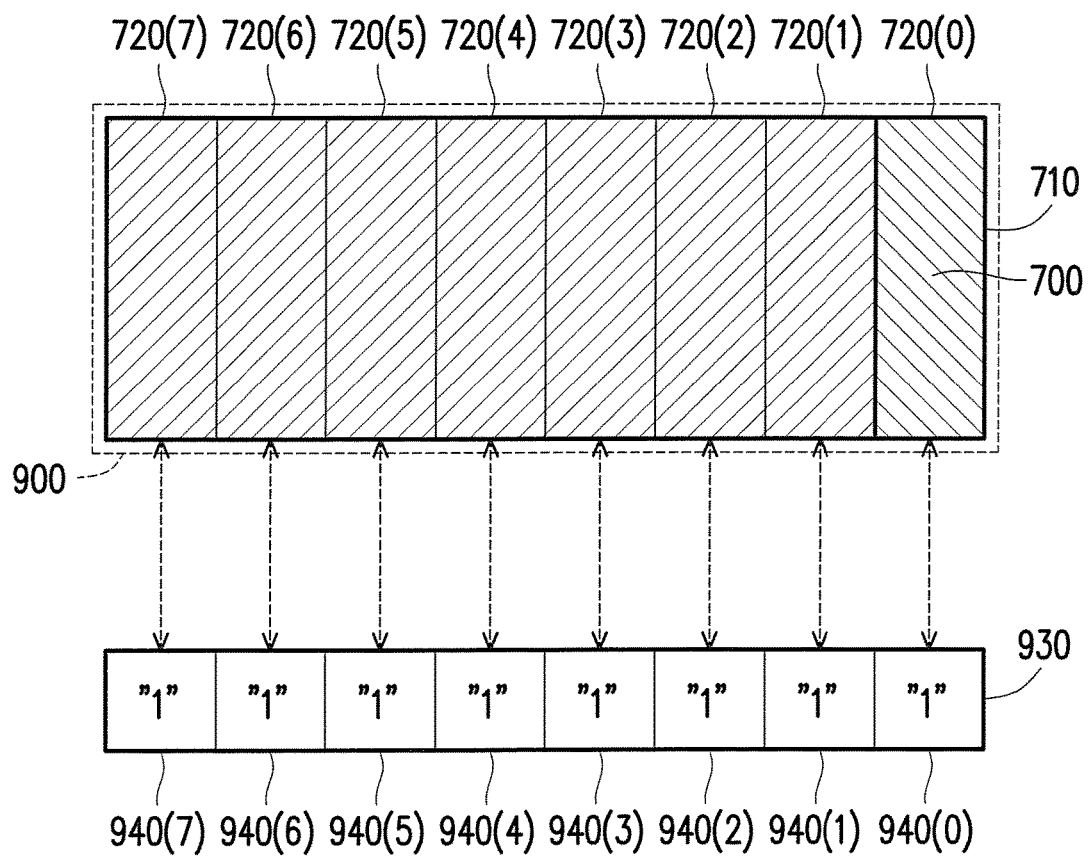
FIG. 9 is a schematic of an aligned data and a valid bits information corresponding to the aligned data illustrated according to an exemplary embodiment.

FIG. 9 is a schematic of an aligned data and a valid bits information corresponding to the aligned data illustrated according to an exemplary embodiment.

Referring to FIG. 9, continuing with the above example, after the fourth processing unit 640 receives the second data 800, the fourth processing unit 640 merges the second data 800 and the first data 700 into an aligned first data 900. The aligned first data 900 would be written into the first logical unit 710. More specifically, the aligned first data 900 includes the first data 700 and the second data 800, wherein the first data is written into the logical sub-unit 720(0) and the second data 800 is written into the logical sub-units 720(1)-720(7).

After the fourth processing unit 640 receives the second valid bits information 830 (such as the valid bits values 840(1)-840(7)) corresponding to the second data 800, the fourth processing unit 640 merges the second valid bits information 830 corresponding to the second data 800 and the first instruction information 730 (as shown by the arrows in FIG. 8) to adjust the first instruction information 730 to an aligned first instruction information 930 corresponding to the aligned first data 900.

For instance, referring further to FIG. 9, the valid bits values 840(1)-840(7) of the second valid bits information 830 corresponding to the second data 800 are "1", "1", "1", "1", "1", "1", "1", and the valid bits values 840(1)-840(7) correspond to the second data 800 stored in the logical sub-units 720(1)-720(7). As a result, the valid bits values 840(1)-840(7) of "1", "1", "1", "1", "1", "1", "1" would be used to replace the first bit values 740(1)-740(7) of "0", "0", "0", "0", "0", "0", "0" corresponding to the logical sub-units 720(1)-720(7) originally located in the first instruction information 730. As a result, the adjusted first instruction information 730 becomes the aligned first instruction information 930 corresponding to the aligned first data 900, wherein the bit values 940(0)-940(7) of the aligned first instruction information 930 are marked as "1", "1", "1", "1", "1", "1", "1", "1". And, the load-align operation to the first data 700 performed by the first processing unit 610 and the fourth processing unit 640 is complete.

In the present exemplary embodiment, after the load-align operation is performed and before the load-align operation is complete (e.g., during a period of the load-align operation), the fourth processing unit 640 further determines whether a predetermined event occurs. The predetermined event is, for instance, a power error event, a rapid task execution queue event, or a clear task queue event.

Regarding the task queue, in the present exemplary embodiment, the memory management circuit 502 stores the detailed description of each of the commands to be executed to the rewritable non-volatile memory module 406 in special blocks (such as flash parameter units, or also called memory parameter units) in the random access memory of the memory management circuit 502. In other words, the detailed description of each of the commands (e.g., command description) is stored in the flash parameter units respectively corresponding to each of the commands. The memory management circuit 502 uses a plurality of pointers to point to the special blocks corresponding to each of the commands so that the memory management circuit 502 can obtain command descriptions recorded in the special blocks from the special blocks pointed to by the pointers through the pointers, so as to execute the commands via the command descriptions. In short, the memory management circuit 502 can point to the corresponding command description through the pointers to execute the commands corresponding to the pointers, so as to perform the task corresponding to the command. Moreover, the memory management circuit 502 may also record and arrange a plurality of pointers in the task queue, and execute the corresponding command/task according to the pointers in the task queue by executing the task queue.

The power error event occurs, for instance, when the fourth processing unit 640 receives an abnormal power failure notification. The rapid task execution queue event occurs, for instance, when the fourth processing unit 640 receives a command configured to instruct rapid completion of the execution of the current task queue. The clear task queue event occurs, for instance, when the fourth processing unit 640 receives a command configured to instruct clearing the current task queue.

When the fourth processing unit 640 determines the predetermined event occurs, the fourth processing unit 640 may need to immediately write the first data and the first instruction information stored in the write buffer into the rewritable non-volatile memory module 406.

Specifically, if the predetermined event occurs, the fourth processing unit 640 and the first processing unit 610 stop the processing load-align operation. The fourth processing unit 640 sends the first data 700 and the first instruction information 730 to the first processing unit 610, and instructs the first processing unit 610 to write the first data 700 and the first instruction information 730 into a special physical erasing unit (also referred to as first physical erasing unit hereinafter). In the present exemplary embodiment, the first processing unit 610 uses the first instruction information as a first valid bits information corresponding to the first data 700, and writes the first valid bits information and the first data 700 into the first physical erasing unit.

In the present exemplary embodiment, the first physical erasing unit is a physical erasing unit reserved in advance for the operation of a predetermined event. For instance, after the memory storage apparatus 10 is turned on, the memory management circuit 502 selects one physical erasing unit as the first physical erasing unit from the system area or the spare area. It should be mentioned that, the disclosure does not limit the quantity of the first physical erasing unit. In addition to storing the above first data and first instruction information, the first physical erasing unit can further store other information for the predetermined event. For instance, the first physical erasing unit may further be configured to store a logic-to-physical address mapping table, a logic-to-physical address sub-mapping table, other management information temporarily stored in the random access memory, and other data stored in the write buffer and corresponding instruction information. In another embodiment, the above first data and first instruction information may also be respectively stored in different first physical erasing units.

In the present exemplary embodiment, the second processing unit 620 may execute a recovery operation corresponding to the predetermined event. For instance, if the predetermined event is a power error event, after power supply is resumed, the second processing unit 620 may execute a recovery operation for the power error event. In the recovery operation, the second processing unit 620 may instruct the first processing unit 610 to read the first data 700 and the first valid bits information stored in the first physical erasing unit, such that the first processing unit 610 and the second processing unit 620 may perform load-align operation corresponding to the first data 700 to the first data 700 again according to the first data 700 and the first valid bits information.

More specifically, in an embodiment, the second processing unit 620 uses the read first valid bits information as the first instruction information 730 corresponding to the first data 700. Then, similarly to the load-align operation performed by the fourth processing unit 640 and the first processing unit 610, the second processing unit 620 and the first processing unit 610 (cooperatively) perform load-align operation to the first data 700 again and obtain the aligned first data 900 and aligned first instruction information corresponding to the aligned first data. Relevant details are similar to the foregoing load-align operation performed by the fourth processing unit 640 and the first processing unit 610 and are not repeated herein. It should be mentioned that, similarly to the first instruction information, the read first valid bits information has a plurality of valid bits values, wherein each of the valid bits values respectively corresponds to each of the logical sub-units of the first logical unit, wherein the valid bits value corresponding to the at least one first logical sub-unit in the valid bits values is a first value, and the valid bits value not corresponding to the at least one first logical sub-unit in the valid bits values is a second value.

Moreover, in another embodiment, the first processing unit 610 may identify at least one valid bits value of the second value (such as "0") among the plurality of valid bits values of the first valid bits information 730 and at least one logical sub-unit (also referred to as second logical sub-unit) corresponding to the at least one valid bits value of the second value according to the first valid bits information 730, and read the second data 800 from the second physical programming unit mapped to the first logical unit according to the at least one second logical sub-unit (e.g., the at least one second logical sub-unit belongs to the first logical unit). Then, the second processing unit 620 generates the aligned first data 900 according to the second data 800 and the first data 700 stored in the first physical erasing unit.

However, it should be mentioned that, in the re-performed load-align operation (e.g., the loaf-align operation in the recovery operation), the second processing unit 620 and the first processing unit 610 perform the load-align operation. In other words, in the re-performed load-align operation, the second processing unit 620 replaces the fourth processing unit 640 to merge the first data 700 and the second data 800, and adjusts the first instruction information 730 according to the second valid bits information corresponding to the second data 800 to obtain the aligned first data 900 and the aligned first instruction information 930 corresponding to the aligned first data 900.

Moreover, as described above, in the present exemplary embodiment, the aligned first data 900 and the aligned first instruction information 930 obtained through the load-align operation of the first data 700 would be written into the rewritable non-volatile memory module 406 according to the write command.

Specifically, the fourth processing unit 640 may send the obtained aligned first data 900 and aligned first instruction information 930 to the second processing unit 620, and the second processing unit 620 may send the aligned first data 900 and the aligned first instruction information 930 to the first processing unit 610. The first processing unit 610 uses the aligned first instruction information 930 as the valid bits information (also referred to as third valid bits information) corresponding to the aligned first data 900. Then, the first processing unit 610 writes the aligned first data 900 into a physical programming unit (also referred to as first physical programming unit) and writes the third valid bits information into the first spare area corresponding to the first physical programming unit. Similarly, regarding the re-performed load-align operation in the recovery operation, the second processing unit 620 sends the aligned first data 900 and the aligned first instruction information 930 obtained from the re-performed load-align operation to the first processing unit 610. The subsequent operations are as described above and are not repeated herein.

In the present exemplary embodiment, after writing the aligned first data 900 into the first physical programming unit, the first processing unit 610 may map the first physical programming unit to the first logical unit 710.

It should be mentioned that, the operations of the first processing unit 610, the second processing unit 620, the third processing unit 630, and the fourth processing unit 640 can also be used to represent the overall operation of the memory management circuit 502 or the memory control circuit unit 404.

Figure 10:
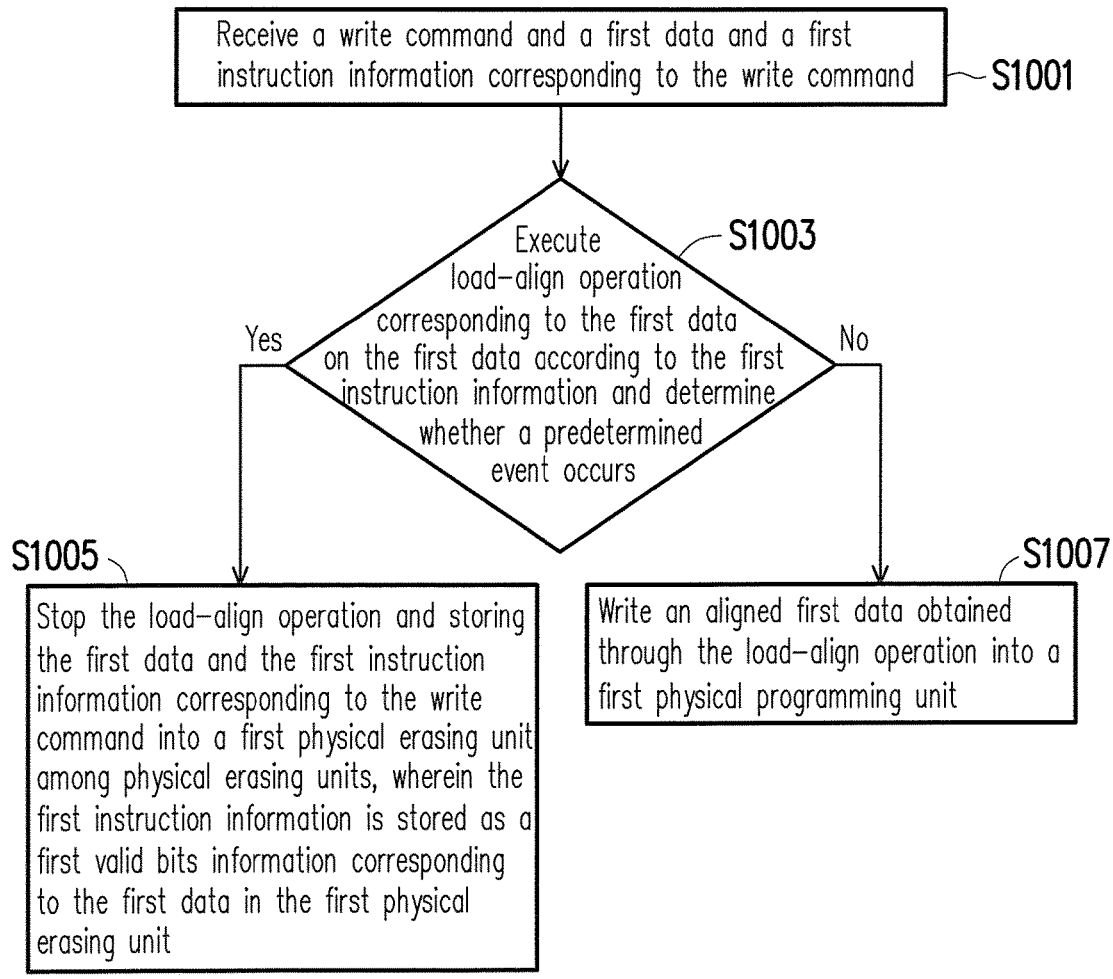
FIG. 10 is a flow chart of a memory management method illustrated according to an exemplary embodiment.

FIG. 10 is a flow chart of a memory management method illustrated according to an exemplary embodiment.

Referring to FIG. 10, in step S1001, the memory control circuit unit 404 receives a write command, the first data 700 and the first instruction information 730 corresponding to the write command. In step S1003, the memory control circuit unit 404 executes load-align operation corresponding to the first data 700 to the first data 700 according to the first instruction information 730 and determines whether the predetermined event occurs.

If the predetermined event occurs, then in step S1005, the memory control circuit unit 404 stops the load-align operation and stores the first data 700 and the first instruction information 730 corresponding to the write command in the first physical erasing unit among the physical erasing units, wherein the first instruction information 730 is stored as a first valid bits information corresponding to the first data 700 in the first physical erasing unit.

If the predetermined event does not occur, then in step S1007, the memory control circuit unit 404 writes the aligned first data 900 obtained through the load-align operation into the first physical programming unit.

Based on the above, when a predetermined event occurs, the memory management method, the memory control circuit unit, and the memory storage apparatus provided by the present exemplary embodiments can rapidly store the instruction information originally configured to perform load-align operation on the write data and the write data in a predetermined physical erasing unit under the conditions of not having to compute the progress of the load-align operation and using the original instruction information, thus saving time for processing the predetermined event.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A memory management method configured for a rewritable non-volatile memory module, wherein the rewritable non-volatile memory module comprises a plurality of physical erasing units, wherein each of the physical erasing units of the physical erasing units has a plurality of physical programming units, and the memory management method comprises:

receiving a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit;

executing a load-align operation corresponding to the first data to the first data according to the first instruction information;

writing an aligned first data obtained through the load-align operation into a first physical programming unit if a predetermined event does not occur during the load-align operation; and stopping the load-align operation and storing the first data and the first instruction information corresponding to the write command into a first physical erasing unit among the physical erasing units if the predetermined event occurs during the load-align operation, wherein the first instruction information is stored as a first valid bits information corresponding to the first data in the first physical erasing unit.

2. The method of claim 1, wherein the step of executing the load-align operation corresponding to the first data to the first data according to the first instruction information comprises:

reading a second data from a second physical programming unit mapped to the first logical unit; and
generating the aligned first data according to the second data and the first data.

3. The method of claim 1, further comprising:

executing the load-align operation corresponding to the first data to the first data according to the first data and the first valid bits information stored in the first physical erasing unit after the predetermined event occurs to obtain the aligned first data.

4. The method of claim 3, wherein the first valid bits information has a plurality of valid bits values, wherein each of the valid bits values of the valid bits values respectively corresponds to each of the logical sub-units of the first logical unit, wherein the valid bits value corresponding to the at least one first logical sub-unit among the valid bits values is a first value, wherein the valid bits value not corresponding to the at least one first logical sub-unit among the valid bits values is a second value.

5. The method of claim 4, wherein the step of executing the load-align operation corresponding to the first data to the first data according to the first data and the first valid bits information stored in the first physical erasing unit to obtain the aligned first data comprises:
identifying at least one valid bits value of the second value among the valid bits values and at least one second logical sub-unit corresponding to the at least one valid bits value of the second value;
reading the second data from the second physical programming unit mapped to the first logical unit according to the at least one second logical sub-unit; and
generating the aligned first data according to the second data and the first data stored in the first physical erasing unit.

6. The method of claim 1, wherein the predetermined event is a power error event, a rapid task execution queue event, or a clear task queue event.

7. A memory control circuit unit configured to control a memory storage apparatus, the memory control circuit unit comprising:
a host interface coupled to a host system;
a memory interface coupled to a rewritable non-volatile memory module, wherein the rewritable non-volatile memory module comprises a plurality of physical erasing units, wherein each of the physical erasing units has a plurality of physical programming units; and
a memory management circuit, comprising:
a first processing unit coupled to the memory interface;
a second processing unit coupled to the first processing unit;
a third processing unit coupled to the host interface; and
a fourth processing unit coupled to the first processing unit, the second processing unit, and the third processing unit,
wherein the third processing unit receives a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit,
wherein the fourth processing unit and the first process unit execute a load-align operation corresponding to the first data to the first data according to the first instruction information,
wherein the first processing unit writes an aligned first data obtained through the load-align operation into a first physical programming unit if a predetermined event does not occur during the load-align operation,
wherein the fourth processing unit and the first processing unit stop the load-align operation if the predetermined event occurs during the load-align operation, and the first processing unit stores the first data and the first instruction information corresponding to the write command into a first physical erasing unit among the physical erasing units, wherein the first instruction information is stored as a first valid bits information corresponding to the first data in the first physical erasing unit.

8. The memory control circuit unit of claim 7, wherein in the operation in which the fourth processing unit and the first processing unit execute the load-align operation corresponding to the first data to the first data according to the first instruction information,
the first processing unit reads a second data from a second physical programming unit mapped to the first logical unit,
wherein the fourth processing unit generates the aligned first data according to the second data and the first data.

9. The memory control circuit unit of claim 7, wherein after the predetermined event occurs, the second processing unit and the first processing unit execute the load-align operation corresponding to the first data to the first data according to the first data and the first valid bits information stored in the first physical erasing unit to obtain the aligned first data.

10. The memory control circuit unit of claim 9, wherein the first valid bits information has a plurality of valid bits values, wherein each of the valid bits values of the valid bits values respectively corresponds to each of the logical sub-units of the first logical unit, wherein the valid bits value corresponding to the at least one first logical sub-unit among the valid bits values is a first value, wherein the valid bits value not corresponding to the at least one first logical sub-unit among the valid bits values is a second value.

11. The memory control circuit unit of claim 10, wherein in the operation in which the second processing unit and the first processing unit execute the load-align operation corresponding to the first data to the first data according to the first data and the first valid bits information stored in the first physical erasing unit to obtain the aligned first data,
the first processing unit identifies at least one valid bits value of the second value among the valid bits values and at least one second logical sub-unit corresponding to the at least one valid bits value of the second value,
wherein the first processing unit reads the second data from the second physical programming unit mapped to the first logical unit according to the at least one second logical sub-unit,
wherein the second processing unit generates the aligned first data according to the second data and the first data stored in the first physical erasing unit.

12. The memory control circuit unit of claim 7, wherein the predetermined event is a power error event, a rapid task execution queue event, or a clear task queue event.

13. A memory storage apparatus, comprising:
a connection interface unit configured to be coupled to a host system;
a rewritable non-volatile memory module, wherein the rewritable non-volatile memory module comprises a plurality of physical erasing units, wherein each of the physical erasing units of the physical erasing units has a plurality of physical programming units; and
a memory control circuit unit coupled to the connection interface unit and the rewritable non-volatile memory module, wherein the memory control circuit unit receives a write command and a first data and a first instruction information corresponding to the write command, wherein the write command is configured to instruct writing the first data into a first logical unit, wherein the first logical unit has a plurality of logical sub-units, wherein the first instruction information is configured to instruct writing the first data into at least one first logical sub-unit among the logical sub-units of the first logical unit, wherein the memory control circuit unit executes a load-align operation corresponding to the first data to the first data according to the first instruction information, wherein the memory control circuit unit writes an aligned first data obtained through the load-align operation into a first physical programming unit if a predetermined event does not occur during the load-align operation, wherein the memory control circuit unit stops the load-align operation and stores the first data and the first instruction information corresponding to the write command into a first physical erasing unit among the physical erasing units if the predetermined event occurs during the load-align operation, wherein the first instruction information is stored as a first valid bits information corresponding to the first data in the first physical erasing unit.

14. The memory storage apparatus of claim 13, wherein in the operation in which the memory control circuit unit executes the load-align operation corresponding to the first data to the first data according to the first instruction information, the memory control circuit unit reads a second data from a second physical programming unit mapped to the first logical unit, wherein the memory control circuit unit generates the aligned first data according to the second data and the first data.

15. The memory storage apparatus of claim 13, wherein after the predetermined event occurs, the memory control circuit unit executes the load-align operation corresponding to the first data to the first data according to the first data and the first valid bits information stored in the first physical erasing unit to obtain the aligned first data.

16. The memory storage apparatus of claim 15, wherein the first valid bits information has a plurality of valid bits values, wherein each of the valid bits values of the valid bits values respectively corresponds to each of the logical sub-units of the first logical unit, wherein the valid bits value corresponding to the at least one first logical sub-unit among the valid bits values is a first value, wherein the valid bits value not corresponding to the at least one first logical sub-unit among the valid bits values is a second value.

17. The memory storage apparatus of claim 16, wherein in the operation in which the memory control circuit unit executes the load-align operation corresponding to the first data to the first data according to the first data and the first valid bits information stored in the first physical erasing unit to obtain the aligned first data, the memory control circuit unit identifies at least one valid bits value of the second value among the valid bits values and at least one second logical sub-unit corresponding to the at least one valid bits value of the second value, wherein the memory control circuit unit reads the second data from the second physical programming unit mapped to the first logical unit according to the at least one second logical sub-unit, wherein the memory control circuit unit generates the aligned first data according to the second data and the first data stored in the first physical erasing unit.

18. The memory storage apparatus of claim 13, wherein the predetermined event is a power error event, a rapid task execution queue event, or a clear task queue event.

* * * * *